US012006000B2

(12) United States Patent
Vannieuwenhuyse et al.

(10) Patent No.: US 12,006,000 B2
(45) Date of Patent: Jun. 11, 2024

(54) VESSEL AND DEVICE FOR UPENDING AN ELONGATE ELEMENT FROM A DECK OF THE VESSEL USING A LIFTING MEANS

(71) Applicant: DEME Offshore BE NV, Zwijndrecht (BE)

(72) Inventors: Kenneth Gerard Vannieuwenhuyse, Sint-Amandsberg (BE); Dieter Wim Jan Rabaut, Ghent (BE)

(73) Assignee: DEME Offshore BE NV, Zwijndrecht (BE)

( * ) Notice: Subject to any disclaimer, the term of this patent is extended or adjusted under 35 U.S.C. 154(b) by 426 days.

(21) Appl. No.: 17/415,901

(22) PCT Filed: Dec. 20, 2019

(86) PCT No.: PCT/EP2019/086752
§ 371 (c)(1),
(2) Date: Jun. 18, 2021

(87) PCT Pub. No.: WO2020/128016
PCT Pub. Date: Jun. 25, 2020

(65) Prior Publication Data
US 2022/0073170 A1 Mar. 10, 2022

(30) Foreign Application Priority Data
Dec. 20, 2018 (BE) .................................. 2018/5922

(51) Int. Cl.
*B63B 25/28* (2006.01)
*B63B 3/48* (2006.01)
(Continued)

(52) U.S. Cl.
CPC ................ *B63B 25/28* (2013.01); *B63B 3/48* (2013.01); *B63B 27/10* (2013.01); *F03D 13/10* (2016.05); *F03D 13/25* (2016.05)

(58) Field of Classification Search
CPC ........... B63B 25/00; B63B 25/28; B63B 3/00; B63B 3/48; B63B 27/00; B63B 27/10;
(Continued)

(56) References Cited

U.S. PATENT DOCUMENTS 7,112,010 B1 * 9/2006 Geiger .................... F03D 13/40
405/203
7,866,274 B2 * 1/2011 Edelson .................. E02D 13/04
114/256
11,008,726 B2 5/2021 Vehmeijer et al.

FOREIGN PATENT DOCUMENTS

DE 202009006507 U1 9/2009
EP 2208824 A1 7/2010
(Continued)

*Primary Examiner* — Lars A Olson
(74) *Attorney, Agent, or Firm* — The Webb Law Firm

(57) ABSTRACT

Described is a vessel and device for upending an elongate element from a deck of the vessel using a lifting means. A number of support structures, mutually coupled and running parallel to each other, for supporting an elongate element in lying position can be displaced collectively, parallel to the deck, relative to the position of the lifting means by displacing means provided for this purpose. A support structure of the device includes an upending tool which is connected for pivoting around an axis running parallel to an edge of the vessel to the relevant support structure and is configured to support an elongate element received in the support structure when this element is upended with the lifting means, wherein the upending tool is rotated around the axis. With the device elongate elements can be moved within reach of a lifting means.

20 Claims, 8 Drawing Sheets

(51) Int. Cl.
  *B63B 27/10*  (2006.01)
  *F03D 13/10*  (2016.01)
  *F03D 13/25*  (2016.01)

(58) Field of Classification Search
  CPC .......... F03D 13/00; F03D 13/10; F03D 13/25;
                                              F03D 13/40
  USPC ....................................................... 114/268
  See application file for complete search history.

(56) References Cited

FOREIGN PATENT DOCUMENTS

| | | | |
|---|---|---|---|
| EP | 2886722 | B1 | 7/2016 |
| KR | 1020180126767 | A | 11/2018 |
| TW | 201215538 | A1 | 4/2012 |
| WO | 2018117846 | A1 | 6/2018 |

* cited by examiner

VESSEL AND DEVICE FOR UPENDING AN ELONGATE ELEMENT FROM A DECK OF THE VESSEL USING A LIFTING MEANS

CROSS-REFERENCE TO RELATED APPLICATIONS

This application is the United States national phase of International Application No. PCT/EP2019/086752 filed Dec. 20, 2019, and claims priority to Belgian Patent Application No. 20185922 filed Dec. 20, 2018, the disclosures of which are hereby incorporated by reference in their entirety.

BACKGROUND OF THE INVENTION

Field of the Invention

The invention relates to a vessel and a device for upending an elongate element, for instance a hollow tubular element, from a deck of the vessel using a lifting means. The invention also relates to a device for supporting a number of elongate elements in lying position on a deck of a vessel. The invention further relates to a method for upending an elongate element from a deck of a vessel using a lifting means, and for moving within reach of a lifting means provided on the deck of a vessel an element to be lifted by the lifting means. The reach of the lifting means is bounded by a minimum and a maximum distance or radius, calculated from a rotation point of the lifting means.

The invention will be elucidated hereinbelow in the light of the offshore placing of a wind turbine. The reference to a wind turbine does not imply that the invention is limited to the use in the context of such a wind turbine. The device and method can in principle be applied to any elongate element which has to be supported on a deck of a vessel, optionally has to be transported over sea in lying position, and, once on site, has to be upended.

Description of Related Art

An offshore wind turbine is generally placed on a support structure which is anchored to the seabed. The support structure bridges the distance from the seabed to a position above the water surface and can be embodied in different ways. The support structure can thus comprise a single pile (a monopile) or be embodied as a lattice structure, also referred to as jacket. The support structure can be anchored to the seabed, for instance by means of arranging a suitable foundation in the seabed.

For reasons of efficiency it is important to be able to transport as many monopiles as possible with one vessel to an offshore location where the monopiles must be upended and lowered into the water. Monopiles are however hollow tubular structures with a considerable length, and the space on a vessel is limited.

In order to be able to transport monopiles in lying position in orderly manner the deck of a vessel can be provided with a device which comprises a number of elongate support structures running parallel to each other. Each support structure is provided with a carrying surface which has roughly the same shape as a peripheral wall part of the monopile and supports the peripheral part when the monopile is received in the support structure. Each monopile, or each elongate element in general, is here fixed with known means to the support structure.

EP 2 208 824 A1 describes a device and method for upending an elongate element, in this case an offshore foundation, from a deck of a vessel. The foundation is received in a support structure which comprises two support parts which are placed at a mutual distance in a longitudinal direction of the support structure and are further connected pivotally to the deck. Also described are displacing means, which are however not configured to displace the support structures collectively, parallel to the deck, relative to the position of the lifting means.

KR 2018 0126767 A likewise describes a device for upending an elongate element, such as a wind turbine blade, from a deck of a vessel using a lifting means. The shown device can comprise a number of mutually coupled support structures which run parallel to each other and which each support a wind turbine blade in lying position. Winches are configured to displace the support structures collectively, parallel to the deck, relative to the position of a crane placed on the afterdeck. A two-part vessel is proposed, wherein the lifting and placing are performed from a platform and wherein a second transport vessel supplies wind turbine blades and moors to the platform. A rail guide displaces the support structures for the wind turbine blades from the transport vessel to the platform.

WO 2018/117846 A1 describes the upending of a monopile with a drive rod, while TW 201 215 538 A describes the upending of a full wind turbine mast.

EP 2 886 722 A1 describes a movement-damped pile gripper.

Finally, DE 20 2009 006 507 U1 discloses the upending of a monopile from a vessel around a hinge, wherein support racks for the monopiles are used, as well as a guide structure, mounted on the vessel, for an upended monopile.

It is important to not only be able to transport the greatest number of elements possible on the deck of a vessel, but also, once on site, to perform the upending of elements for moving them in the direction of the seabed as efficiently as possible, which usually amounts to performing the work in the shortest possible time span. The efficiency of the work is however limited by an existing trend for the dimensions of elongate elements, such as monopiles, to be placed at sea to keep increasing. The greater dimensions of the elements necessitate the use of larger lifting means with an increased range of operation. This is understood to mean both the maximum load to be lifted and the reach of the lifting means. The greater dimensions of the lifting means and the elements are difficult to reconcile with the limited space available on a vessel.

SUMMARY OF THE INVENTION

The present invention has for its object to provide a device for upending an elongate element from a deck of a vessel using a lifting means, wherein the above stated drawbacks of the prior art are at least partially obviated.

According to the invention, this object is achieved by providing a device as described herein. Particularly provided is a device for upending an elongate element from a deck of a vessel using a lifting means, comprising:
- a number of support structures, mutually coupled and running parallel to each other, for supporting an elongate element in lying position, wherein each support structure comprises for this purpose two support parts, placed at a mutual distance in a longitudinal direction of the support structure and connected to the deck, for peripheral parts of an element; and
- displacing means configured to displace the support structures collectively, parallel to the deck, relative to the position of the lifting means, wherein a support structure of the device further comprises an upending tool which is connected for pivoting around an axis running parallel to an edge of the vessel to the relevant support structure and is configured to support an elongate element received in the support structure when this element is upended with the lifting means, wherein the upending tool is rotated around the axis.

A number of advantages is achieved in this way. The displacing means, which are configured to displace elements received in a number of support structures collectively relative to the deck and parallel to the deck in the lying position, for instance make it possible to move an element within reach of a lifting means, which can then take up and upend the element and carry it to an end position. For a monopile, this is for instance a foundation anchored to the seabed. It can also be useful to displace an element relative to other elements present in the support structures in order to free up space for another element in the support structure. The displacement relative to the lifting means can comprise a displacement toward the position of the lifting means or away from the position of the lifting means. In this way an element can be moved within reach of the lifting means. The boom of a lifting crane can indeed be rotated through determined angles so that a circular area can be covered in a horizontal plane. This circular area is bounded by a minimum radius, wherein the boom of the lifting means can be luffed in maximally as allowed by the design of the lifting means, and a maximum radius wherein the boom of the lifting means can be lowered (luffed out) maximally as allowed by its design and a load to be lifted.

For the sake of efficient use of the (limited) space on a deck of a vessel the elongate elements are preferably stored on the deck in a space-saving manner. A suitable storage manner relates to support structures which run parallel to each other and in which an element is in each case received, this such that a longitudinal direction of the element runs parallel to the longitudinal direction of the support structure in which it is received. In an embodiment of the invention the displacing means are configured to displace the element in a direction running substantially perpendicularly of the longitudinal direction of the support structures. This makes it possible to displace an element transversely of the longitudinal direction of the support structures, whereby the mutual parallelism of the elements is preserved. According to an embodiment, the longitudinal direction of a support structure is defined by the line connecting the two support parts disposed at a mutual distance.

The elements are received in the support parts of each support structure. According to an embodiment of the invention, a support surface of a support part is for this purpose curved such that it connects to a peripheral part of an element received in the support structure, and more preferably connects fittingly to a peripheral part of an element received in the support structure. The support parts are preferably provided in their support surface with saddles on which peripheral parts of an element find support. In order to obtain an improved support, saddles can be embodied for rotation around an axis running parallel to the deck of the vessel.

Another embodiment of the invention is characterized in that the displacing means are configured to displace the support structures relative to the deck and parallel to the deck, in the direction of the lifting means.

As already noted above, the space on a deck of a vessel is limited. One of the intended advantages of the invented device is furthermore that elements stored on the deck and an upending tool can be moved within reach of the lifting means. This prevents a larger lifting means having to be used. The lifting means itself can however form an additional space restriction for support structures which are moved in the direction of the lifting means. It is therefore advantageous to characterize the device in an embodiment in that the support parts of a support structure in unloaded state, in which no element is present in the support parts, are rotatable around an axis running perpendicularly of the deck. The support parts have a certain width which is adapted to the transverse dimensions of an elongate element received therein. By providing the option to rotate the support parts of a support structure around a vertical axis the support parts can for instance be rotated through an angle of 90°. Hereby, they take up less space in the direction of movement of the support structures, which frees up space for a subsequent support structure.

The upending tool which is used in the invented device comprises a structure, mounted on an edge of the vehicle for rotation around a horizontal axis, which comprises at least one support part, preferably two or more support parts, wherein at least one and preferably two or more peripheral parts lying at a mutual distance in the longitudinal direction of the element can be received. According to the invention, the upending tool is configured to support an element received in the relevant support structure in the longitudinal direction when it is suspended from the lifting means during upending. In an embodiment this can be achieved in that the upending tool comprises a bracket part which engages on a lower outer end of an element upended in the lifting means. If desired, the bracket part can comprise telescopically extendable side arms which enable adjustment of the longitudinal distance between the lower outer end and a peripheral part of the element engaged by the upending tool, which provides the option of receiving elements with different dimensions. The upending tool can optionally also comprise a clamping part with which a peripheral part of an element received therein can be received in clamping manner.

Another embodiment of the invention is characterized in that the device comprises a stack of support structures, wherein the support parts of a support structure are situated above support parts of another support structure in the stack. This embodiment allows the number of elements to be transported and upended to be increased without this necessarily having an adverse effect on the space available on the deck of the vessel. An overlying support part can here preferably be removed or folded away in order to allow an element to be given access to an underlying support part and to be arranged in the underlying support part.

The support structure (or the plurality of support structures) comprising the rotatable support parts can in principle be situated at any position in the number of mutually coupled support structures running parallel to each other. It is however advantageous to characterize the device according to an embodiment in that the support structure comprising the rotatable support parts is situated closest to the lifting means relative to the other support structures. This allows the relevant support structure to have the element received therein removed therefrom using the lifting means, after which the support parts thereof can be rotated.

The support structure (or the plurality of support structures) comprising the upending tool can in principle also be situated at any position in the number of mutually coupled support structures running parallel to each other. A practical embodiment relates to a device wherein the support structure comprising the upending tool is situated second closest to the lifting means relative to the other support structures.

Finally, the stack (or the plurality of stacks) of support structures can in principle also be situated at any position in the number of mutually coupled support structures running parallel to each other. According to an embodiment, it is advantageous to provide a device wherein the stack of support structures is situated furthest from the lifting means relative to the other support structures.

The number of support structures in a device according to the invention can in principle be chosen freely and preferably amounts to at least 3, more preferably at least 4, still more preferably at least 5 support structures, and most preferably at least 8 support structures. The support parts of the support structures are configured to each support an elongate element, for instance during transport over sea, and some support structures have an additional function, such as the support structure comprising the rotatable support parts and the support structure comprising the upending tool. With the device according to the invention a relatively large number of objects can be transported. It is thus possible to transport at least 5 objects, more preferably at least 10, still more preferably at least 20, and most preferably at least 30 objects. The dimensions of the objects can play a part here. The number of pin piles to be transported (for instance 25-30) will thus for instance generally be greater than the number of monopiles to be transported (for instance 8-10). The number of support structures with additional function can in principle also be chosen freely. A practical embodiment limits the number of support structures with additional function to at most 4, more preferably at most 3, and most preferably at most 2. In the latter embodiment the device preferably comprises 1 support structure comprising the rotatable support parts and 1 support structure comprising the upending tool. The two functions can also be combined in 1 support structure. The number of stacked support structures can in principle also be chosen freely, wherein in a practical embodiment the number amounts to at most 3, more preferably at most 2, and most preferably at most 1. The number of support parts in the stack is at least 2, and preferably lies between 2 and 4.

The coupling of the support structures can be performed in any manner known to the skilled person. In an embodiment the device according to the invention can for instance be embodied such that the support structures are mutually coupled by coupling of their support parts which are connected to the deck.

The space on the deck of the vessel can be utilized optimally in an embodiment of the device in which the support parts of the support structures connected to the deck—and preferably coupled to each other—extend along a line running substantially parallel to a side edge of the vessel.

In order to be able to utilize the maximal space in the athwartship direction an embodiment of the device is characterized in that the support parts comprise support parts disposed on port side and on starboard side. The elements received in the support parts of the support structures then extend in an athwartship direction, wherein it is possible that outer ends of elements even extended beyond the athwartship width of the vessel.

With the invented device an element to be lifted by a lifting means can be moved within reach of the lifting means provided on the deck of a floating device. In an embodiment of the device a lifting means for taking up an element is for this purpose provided, wherein the displacing means are further configured to displace the element in the direction of the lifting means.

In a suitable method a number of elongate elements is supported in lying position on the deck by a number of elongate support structures which run parallel to each other and each comprise two support parts, placed at a mutual distance in a longitudinal direction of the support structure and connected to the deck, for peripheral parts of an element, wherein an element to be lifted is displaced relative to the deck and parallel to the deck in the lying position.

The displacing means for a support structure can in principle be embodied in any suitable manner. An embodiment of the invention in this respect relates to a device wherein the displacing means comprise a rail guide, connected to the deck, over which the support structures can slide in the direction running perpendicularly of the longitudinal direction of the support structures. It is possible here for all support structures to slide collectively over the rail guide, or for one or more support structures to be slid over the guide relative to other support structures. The support parts can move over sliding surfaces of the rail guide. If desired, the support parts of the support structures are slid collectively over at least two rail guides.

With the invented device an elongate element, such as for instance a monopile of a wind turbine, can be upended more efficiently from a deck of a vessel using a lifting means than is the case with the known device. The invention provides for this purpose a method for upending an elongate element from a deck of a vessel using a lifting means, wherein a number of elongate elements is supported in lying position on the deck by mutually coupled elongate support structures which run parallel to each other and each comprise two support parts, placed at a mutual distance in a longitudinal direction of the support structure and connected to the deck, for peripheral parts of an element, wherein the support structures are collectively displaced, parallel to the deck, relative to the position of the lifting means in order to move an element to be lifted within reach of the lifting means, and wherein a support structure further comprises an upending tool which is connected to the vessel for pivoting around an axis running parallel to an edge of the vessel, and an elongate element received in this support structure is supported by the upending tool when this element is upended with the lifting means, wherein the upending tool is rotated around the axis.

Lifting of an element with the lifting means can for instance be done by fastening an engaging means such as a hoist to an upper outer end of the element and then pulling the engaging means upward with the lifting means. At least the upper outer end of the lying element is hereby moved upward, whereby the element will rotate around a support part on which it supports until the element becomes completely detached, also from this support part.

In suitable embodiments of the invented method the support structures are displaced collectively in a direction running substantially perpendicularly of the longitudinal direction of the support structures, wherein the support structures are preferably displaced in the direction of the lifting means in order to move support structures with rotatable support parts and/or support structures with the upending tool and/or stacked support structures within reach of the lifting means.

In order to free up space, a method is according to another embodiment provided wherein the support parts of a support structure in unloaded state, in which no element is present in the support parts, are rotated around an axis running perpendicularly of the deck, particularly after an element received the support structure has been moved within reach of the lifting means and has been taken up with the lifting means. The rotation makes it possible to move a subsequent support structure, provided with an element, in the direction and within reach of the lifting means, after which the process is repeated.

Other embodiments with the same objective provide a method in which elements are received in a stack of support structures, wherein the support parts of a support structure are situated above support parts of another support structure in the stack. A preferred method is characterized in that the support parts which are rotated are situated closest to the lifting means relative to the other support structures. Another preferred method is characterized in that the support structure which comprises the upending tool is situated second closest to the lifting means relative to the other support structures. Yet another preferred method is characterized in that the stack of support structures is situated furthest from the lifting means relative to the other support structures.

In a method according to an embodiment the support structures are slid over a guide connected to the deck in the direction running perpendicularly of the longitudinal direction of the support structures. The support structures are in this way translated in transverse direction, preferably in the direction of the lifting means. This results in the support structure situated closest to the lifting means also being the first to come within reach of the lifting means. It will thus be evident that an element in the support structure which is situated closest to the lifting means will be the first to be taken up by the lifting means, although this is not essential. The taking up of an element from the closest support structure by the lifting means can for instance serve the purpose of arranging the relevant element in the upending tool, and then upending it.

The elongate elements can for instance comprise hollow tubular elements. The dimensions of the elements are in principle not limited to the specific dimensions, and the advantages of the invention are most clearly manifest in elongate elements with a length amounting to more than 50 m, preferably more than 70 m, still more preferably more than 80 m; and with a transverse dimension, for instance a diameter in the case of a tubular element, amounting to more than 8 m, more preferably more than 10 m, and still more preferably more than 12 m.

The vessel can comprise any vessel suitable for the intended object. It is thus possible for the vessel to comprise a jack-up platform which is immobilized on site by having it support on the underwater bottom. It is also possible for the vessel to comprise a floating vessel. The vessel can be provided with a global positioning system (GPS), and with compensating means which counter movements of the vessel as a result of wave movements and the like.

The embodiments of the invention described in this patent application can be combined in any possible combination of these embodiments, and each embodiment can individually form the subject-matter of a divisional patent application.

BRIEF DESCRIPTION OF THE DRAWINGS

The invention will now be elucidated in more detail with reference to the accompanying figures, without otherwise being limited thereto. In the figures.

DESCRIPTION OF THE INVENTION

Figure 1:
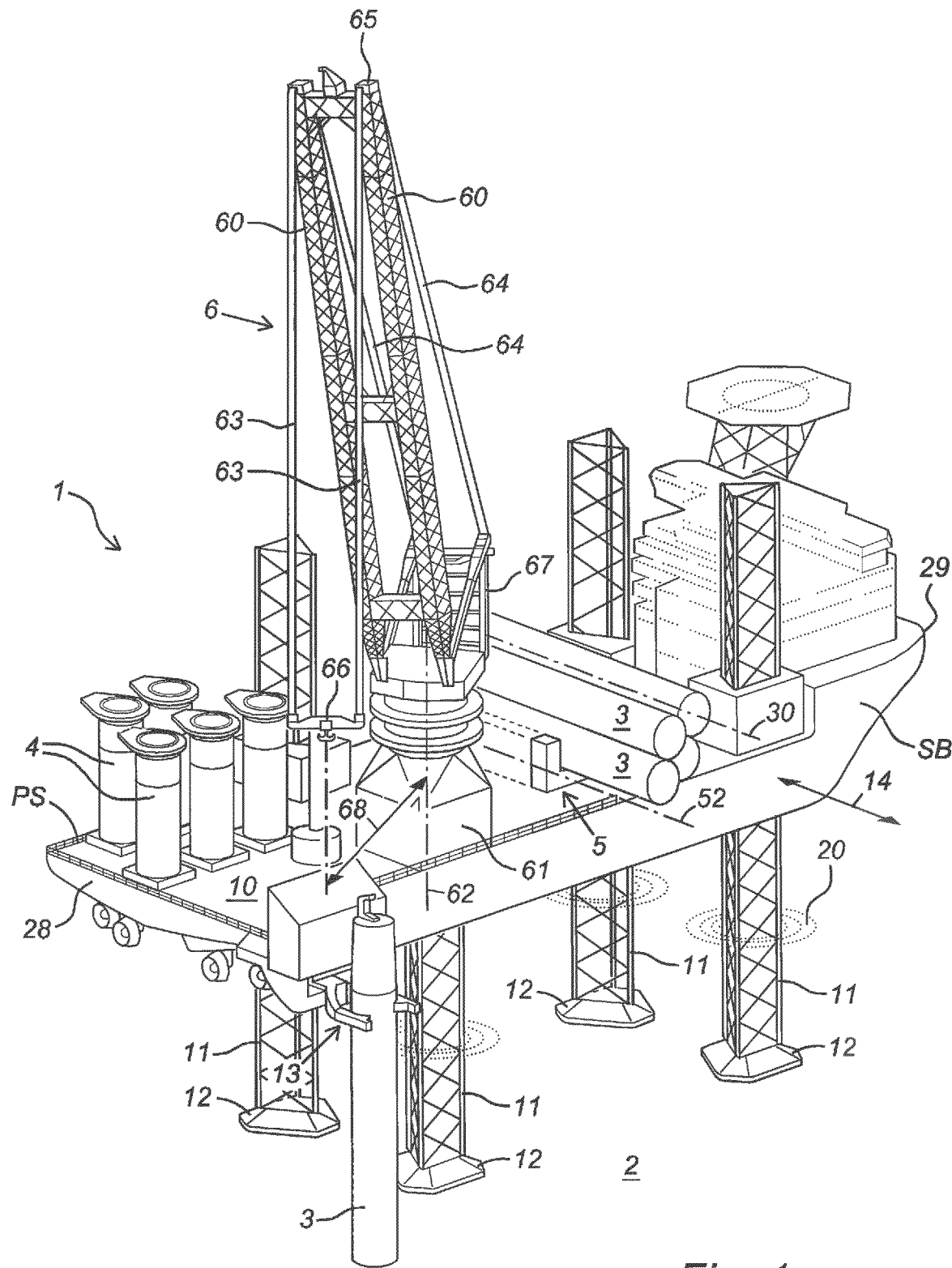
FIG. 1 is a schematic perspective view of a jack-up platform provided with a support structure for lying support of monopiles, and of a lifting means with which a monopile can be taken up.

Referring to FIG. 1, an installation jack-up platform 1 is shown for placing a monopile 3 on a seabed 2. Platform 1 is likewise suitable for placing other elongate elements, such as the transition pieces 4 of a wind turbine mast stored on deck 10. Such a transition piece 4 is arranged on a monopile 3 arranged in seabed 2 as transition to a wind turbine mast (not shown). Jack-up platform 1 with stern 28 and stem 29 can navigate independently and is fixed at a desired position at the destination by lowering of a number of spud poles 11 onto seabed 2. Deck 10 of platform 1 is here lifted from the water so that it comes to lie metres above the water surface 20. Spud poles 11 can be provided with spud cans 12 for preventing spud poles 11 from sinking further into seabed 2.

Components to be placed, for instance a number of monopiles 3, are provided on deck 10 of platform 1. Monopiles 3 are received in a device 5, embodiments of which will be further elucidated below. Monopiles 3 can have considerable dimensions, with lengths of for instance 80 m and diameters of 8 m and more.

Deck 10 of jack-up platform 1 is provided with a lifting means 6 with double boom 60 for taking up the monopiles 3. Lifting means 6 is situated at the position of stern 28 of platform 1 and is rotatable around a base 61, around a substantially vertical axis 62, and further provided with hoisting cables 63 which can be taken in or payed out over a top part 65 of lifting means 6 with winches (not shown) and which are connected at a free outer end to a hoisting block 66 with hook, by which a monopile 3 or other element can be taken up, if desired with interposing of a hoisting yoke with hoisting slings. The angular position of boom 60 can be adjusted by a set of traction cables 64 which connect top part 65 to a support 67 provided on base 61. Traction cables 64 can be taken in or payed out using winches (not shown). When taken in, boom 60 is luffed in, while boom 60 is lowered when traction cables 64 are payed out. The reach of lifting means 6 is given for a load with a determined weight by the minimum and maximum possible horizontal distance 68 between central axis 62 of base 61 and the position of hoisting yoke 66 in which hoisting means 6 is still just stable with this load.

For the sake of completeness, deck 10 of platform 1 can also be provided with a gripping construction 13 for a monopile 3 taken up from support structure 5 by lifting means 6. Gripping construction 13 is configured to engage a monopile 3 hanging from hoisting means 6 and to guide it during the lowering to seabed 2.

An embodiment of the invention relates to a device 5 for supporting a number of elongate monopiles 3 in lying position on deck 10 of jack-up platform 1 and upending a monopile 3 from deck 10 of platform 1, from device 5, using lifting means 6. In the lying position monopiles 3 extend substantially horizontally, in other words substantially parallel to deck 10.

Figure 3:
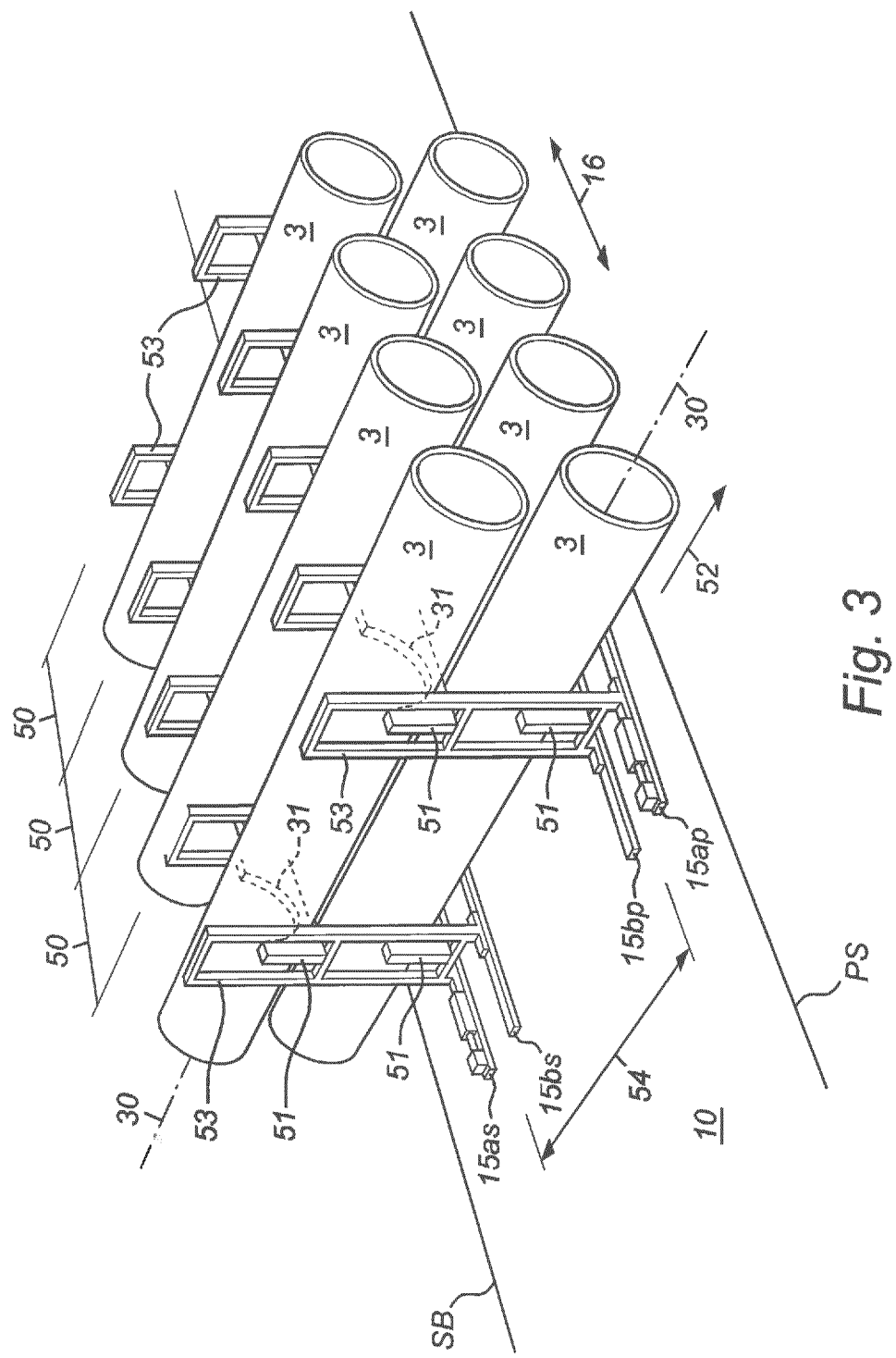
FIG. 3 is a schematic perspective view of a device according to another embodiment of the invention and provided with a number of monopiles.

As can be seen clearly in FIG. 3, a longitudinal direction 30 of monopile 3 runs substantially parallel to the longitudinal direction 52 of support structure 50 in which monopile 3 is received. In the shown embodiments each support structure 50 comprises two support parts 51, placed at mutual distance 54 in the longitudinal direction 52 of support structure 50, although the invention is not limited thereto. A support structure 50 can thus comprise only one support part 51, or conversely more than two. It is also possible to provide a support part 51 running continuously over the distance 54. Each support part 51 has a support surface shaped substantially like a peripheral part 31 of a monopile 3 received or to be received therein. In the shown embodiment each support structure 50 comprises two support parts 51 placed at distance 54, wherein a first series of mutually coupled support parts 51 extends substantially along a line which runs parallel to a starboard side SB of platform 1, and a second series of mutually coupled support parts 51 extends substantially along a line which runs parallel to a port side PS of platform 1. The support parts are displaceable along a bull rail which is connected on the starboard side SB to deck 10, and a bull rail 15ap which is connected to deck 10 on the port side PS, and along secondary rail guides 15bp and 15bs which run parallel to bull rails 15ap and 15as. Bull rail guides 15as and 15ap are configured to transmit the substantially vertical forces generated by support structures and elements received therein to the deck and other components of the vessel. Secondary rail guides 15bp and 15bs are configured to displace at least one support structure in a plane running parallel to the deck, with little risk of jamming. In addition, the secondary rail guides 15 bp and 15bs are configured to transmit the substantially transverse forces generated by support structures and elements received therein to the deck and other components of the vessel. The vertical forces caused during transport and upending of an object are likewise, at least partially, absorbed by the secondary rail guide.

It is noted that the rail guides are not limited to widths which might be associated with rail guides as known in railways. The rail guides of the present invention can have a relatively great width. A running surface (or sliding surface) of the bull rail guide can thus for instance have a width of more than 1 m.

Figure 2A:
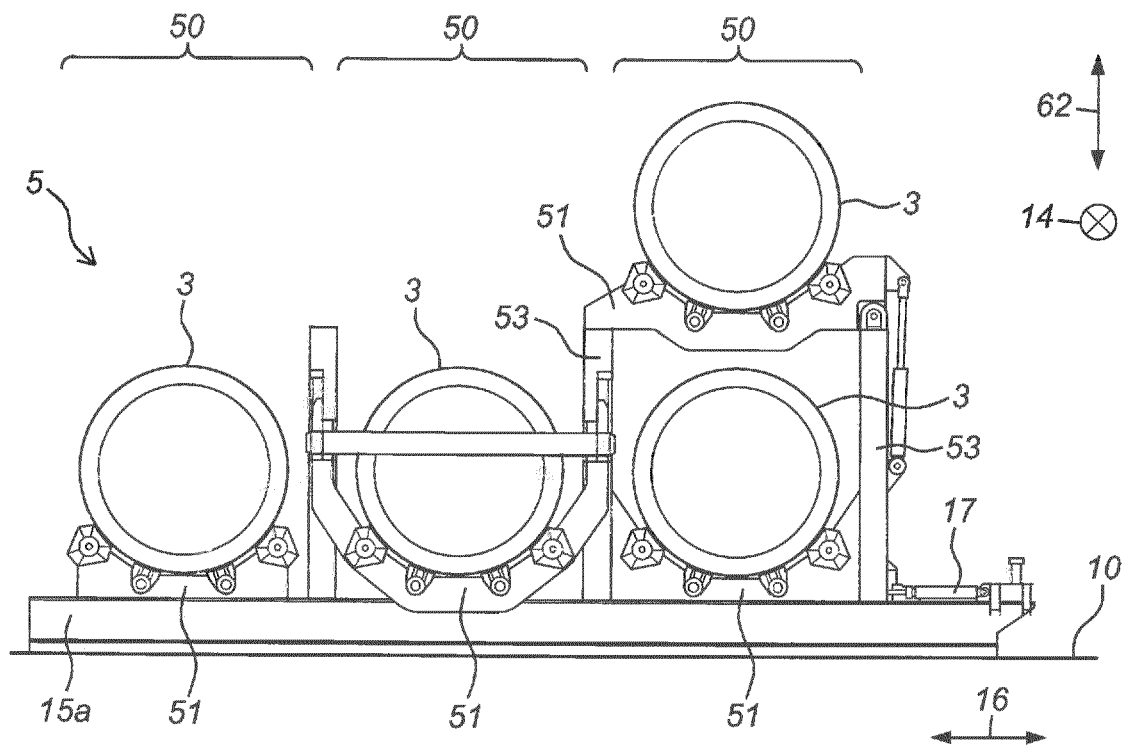
FIG. 2A is a schematic front view of a device according to an embodiment of the invention in a first position.
Figure 2B:
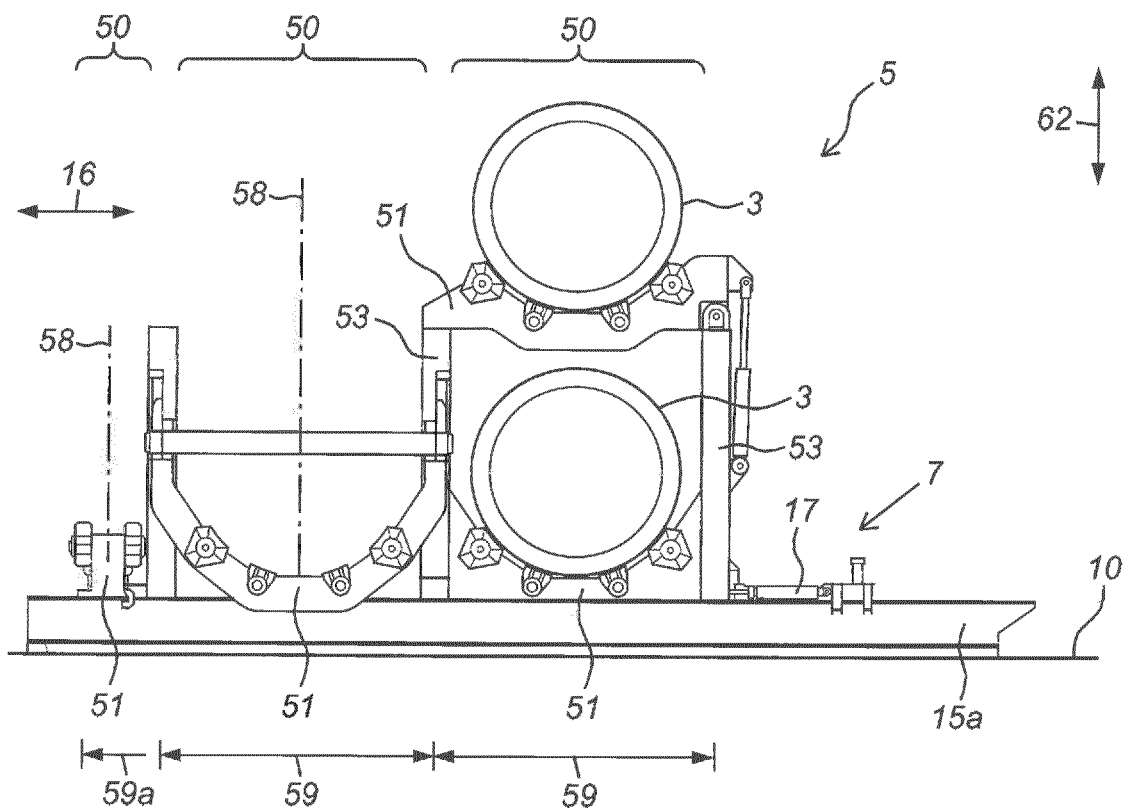
FIG. 2B is a schematic front view of a device according to an embodiment of the invention in a second position.

The side views of an embodiment of device 5 shown in FIGS. 2A and 2B comprise a number of elongate support structures 50 which run parallel to each other along an athwartship direction 14 and which comprise mutually coupled support parts 51 placed at a distance from each other. Support parts 51 are (directly or indirectly) connected to deck 10, for instance via the rail connection 15 shown in FIGS. 2A and 2B, of which only a so-called bull rail 15a of platform 1 is visible in the side view.

Figure 5:
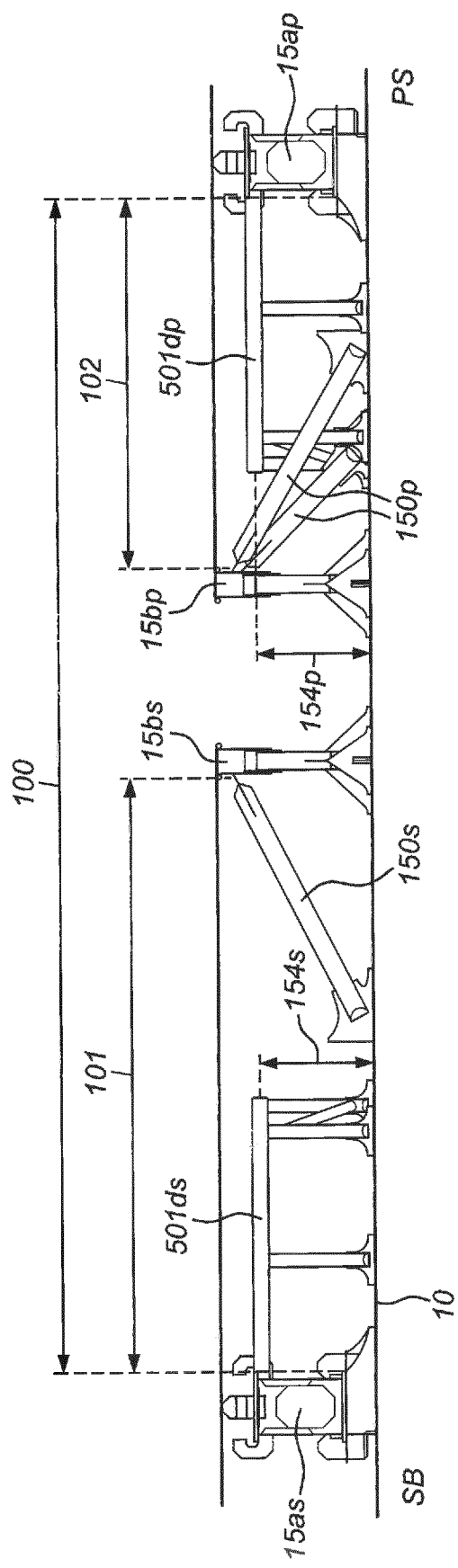
FIG. 5 is a schematic front view of the stem of the vessel of a device according to yet another embodiment of the invention.

Also referring to FIG. 5 (not all component are included in this figure), the secondary rail guides 15 bp and 15bs are connected fixedly to deck 10 of the platform with transverse connections 150p and 150s. Bull rail guides 15as and 15ap are further connected by rotation rail guides 501ds and 501dp connected to deck 10 at a height (154p, 154s). Uprights 53p and 53s and other parts of the support structures (50a, 50b, 50c, 50d) are connected slidably to the secondary rail guides 15 bp and 15bs by means of connecting rods 151p and 151s. Connecting rods 151p and 151s are for this purpose provided at an outer end with secondary sliding shoes 152p and 152s which can slide over the secondary rail guides 15 bp and 15bs. Bull rail guides 15ap and 15as transmit substantially vertical forces to deck 10 of platform 1, while the secondary rail guides 15 bp and 15bs are substantially configured to, together with bull rail guides 15ap and 15as, absorb transverse forces and transmit them to deck 10. According to FIG. 5, the spanned width 101 of the support structures on starboard side SB is greater than the spanned width 102 of the support structures on port side PS. This greater width 101 is necessary to be able to absorb the torques which are generated by the upending tool 8 disposed on starboard side SB during upending of a monopile 3. The distance 100 corresponds substantially to the athwartship width.

A support structure 50 comprises a support part 51 which has a rounded U-shape in cross-section. The side arms of the U-shape provide for a horizontal stabilization of a monopile 3 received therein, while a bottom surface of each support part 51 provides for a vertical stabilization of a monopile 3 received therein. Support parts 51 are received between vertically oriented uprights 53, which transmit the forces caused in support parts 51 by monopiles 3 to rail guide 15 and on to the deck 10 of jack-up platform 1.

Figure 4A:
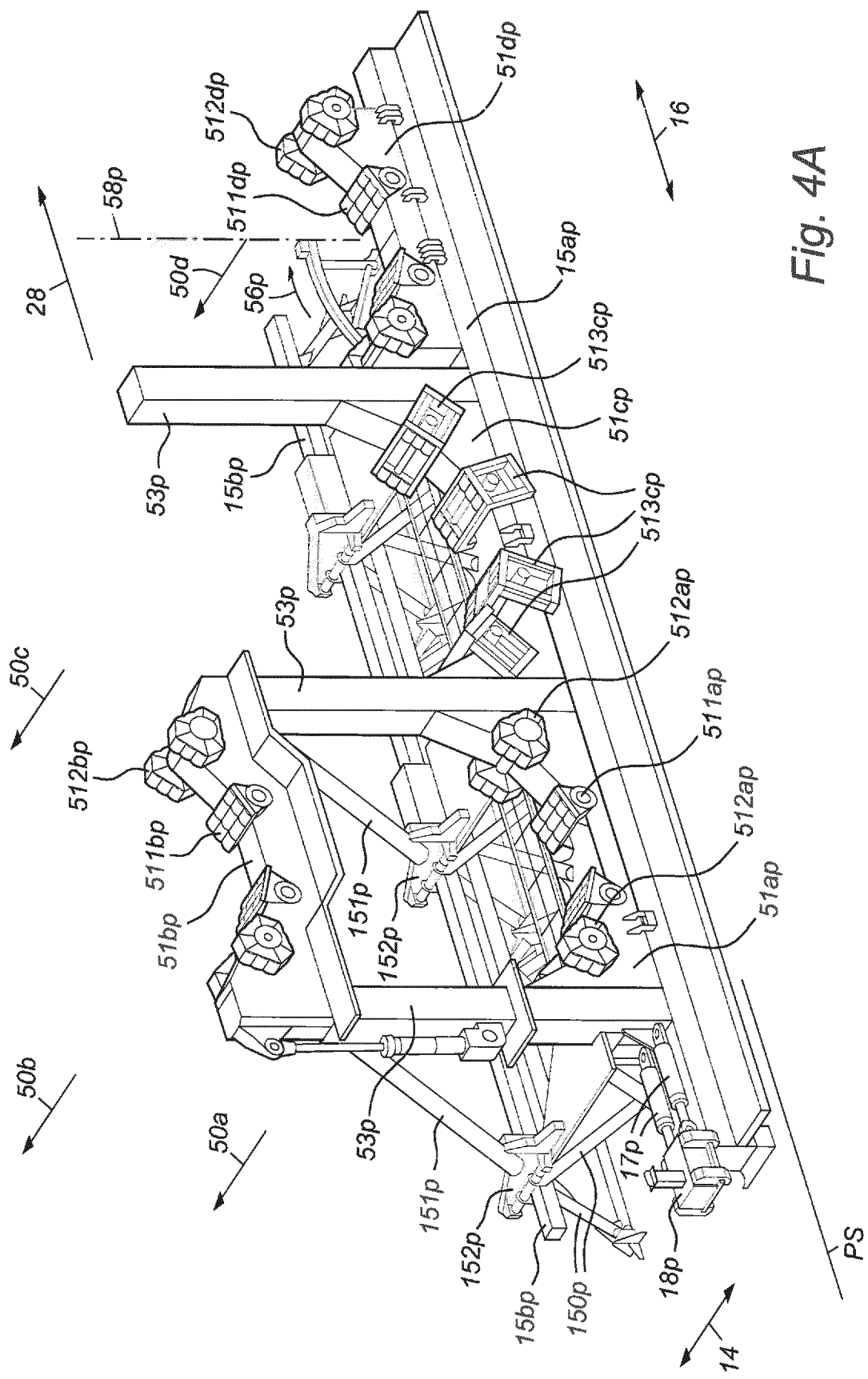
FIG. 4A is a schematic perspective view of a port side structure according to an embodiment of the invention.
Figure 4B:
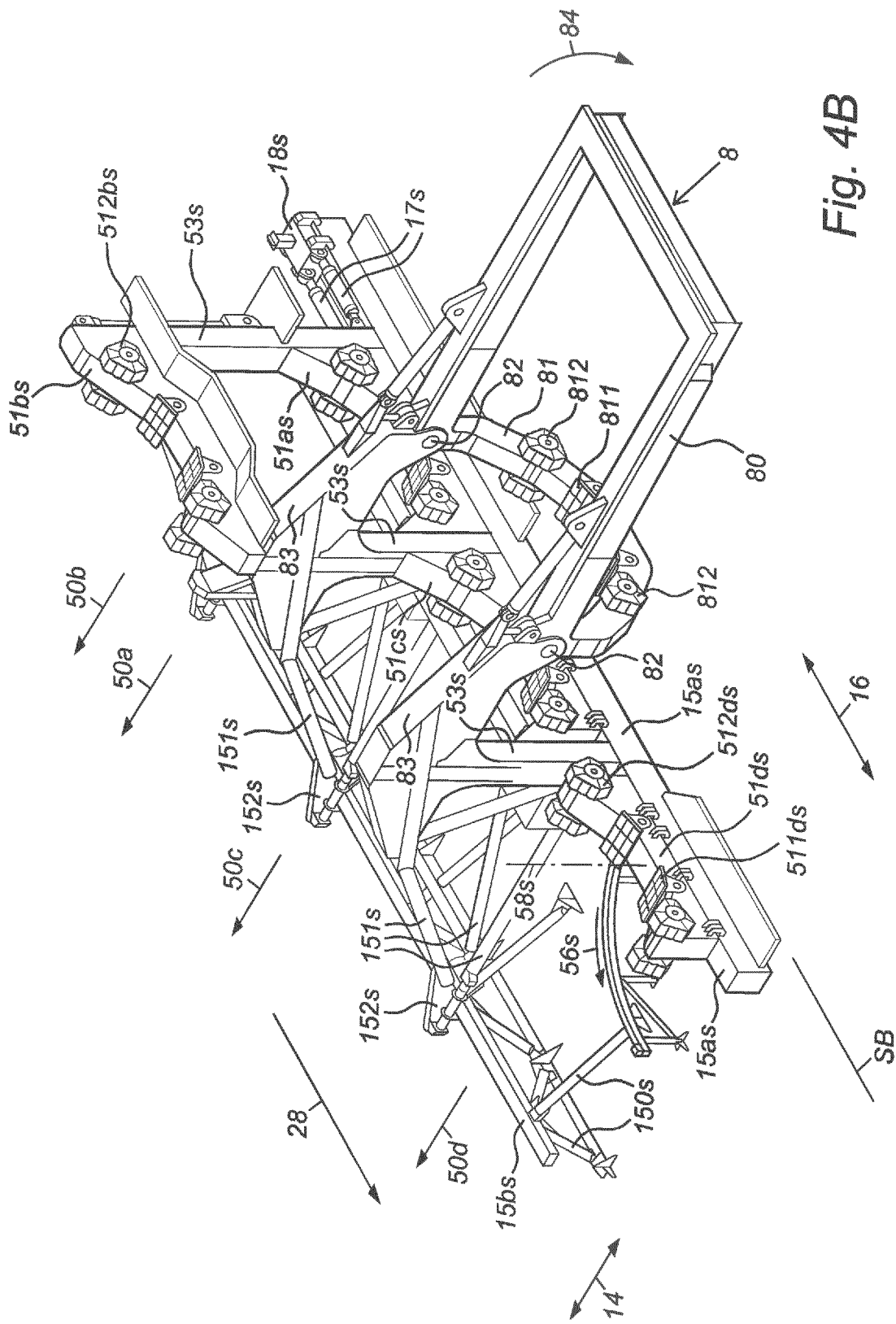
FIG. 4B is a schematic perspective view of a starboard side structure according to an embodiment of the invention.

An embodiment of the device shown in FIGS. 4A and 4B relates to mutually coupled support parts (51ap, 51bp, 51cp, 51dp) provided on the port side PS of platform 1 (FIG. 4A) and mutually coupled support parts (51as, 51bs, 51cs, 51ds) provided on the starboard side SB of platform 1 (FIG. 4B).

A support part (51ap, 51bp, 51cp, 51dp) on port side and a corresponding support part (51as, 51bs, 51cs, 51ds) on starboard side together form an elongate support structure (50a, 50b, 50c and 50d) running along an athwartship direction 14. Each support structure (50a, 50b, 50c and 50d) is connected (directly or indirectly) via the respective support parts (51ap, 51bp, 51cp, 51dp) and (51as, 51bs, 51cs, 51ds) to deck 10. In the shown embodiment this connection comprises a rail connection 15.

Each support part 51 has a rounded U-shape in cross-section. The side arms of the U-shape provide for a horizontal stabilization of a monopile 3 received therein, while a bottom surface of each support part 51 provides for a vertical stabilization of a monopile 3 received therein. Support parts 51 are received between vertically oriented uprights 53 (53p on port side, 53s on starboard side) which transmit the forces caused in support parts 51 by monopiles 3 to the rail guide (15a, 15b) and on to the deck 10 of jack-up platform 1. Each support part 51 has a support surface shaped substantially like a peripheral part 31 of a monopile 3 received or to be received therein. The support surfaces are formed by saddles 511 (511ap, 511bp, 511dp, 511as, 511bs, 511ds), a number of saddles 512 (512ap, 512bp, 512dp, 512as, 512bs, 512ds) of which is embodied for rotation around a horizontal axis. This has the advantage that monopiles 3 with different diameters can be received in saddles 512. The middle support part 51cp is provided on port side PS with saddles 513cp adjustable in the height or other directions.

According to FIG. 4B, the middle support structure 50c is provided with an upending tool 8 which is connected for pivoting around an axis running parallel to a starboard edge SB of platform 1 to the relevant support structure 50c, or at least to support arms 83 which are connected to the vertical upright 53s of the relevant support structure 50c, by means of hinge connections 82. Upending tool 8 comprises one support part 81 which is embodied in the same way as the other support parts 51, and in which a peripheral part of a monopile 3 can be received. Support part 81 thus has a support surface which is shaped substantially like a peripheral part 31 of a monopile 3 received or to be received therein. The support surfaces are formed by saddles 811, a number of saddles 812 of which is embodied for rotation around a horizontal axis. Upending tool 8 further comprises a bracket part 80 which engages in use on a lower outer end of a monopile 3 upended in the lifting means. If desired, bracket part 80 can comprise telescopically extendable side arms which enable adjustment of the longitudinal distance between the lower outer end and a peripheral part of a monopile 3 engaged by the upending tool 8, which provides the option of receiving monopiles 3 with different dimensions. Upending tool 8 can optionally also comprise a clamping part (not shown) with which a peripheral part of a monopile 3 received therein can be received in clamping manner According to an embodiment of the invention, upending tool 8 is configured to support a monopile 3 received in the relevant support structure 50*c* in the longitudinal direction 30 when this monopile 3 is suspended from lifting means 6 and is being upended by lifting means 6. Upending tool 8 is here rotated in the direction 84 around the axis of the pivot connection 82 until the plane of bracket part 80 runs substantially parallel to the vertical direction.

In this embodiment displacing means 7 are configured to displace the support structures (50*a*, 50*b*, 50*c*, 50*d*) collectively relative to deck 10 and parallel to deck 10 over the rail guides (15*ap*, 51*bp*, 51*as*, 51*bs*). This is achieved by displacing the support parts (51*ap*, 51*bp*, 51*cp*, 51*dp*) on port side and the corresponding support parts (51*as*, 51*bs*, 51*cs*, 51*ds*) on starboard side simultaneously over the rail guides (15*ap*, 15*bp*) on port side and the rail guides (15*as*, 15*bs*) on starboard side. Monopiles 3 received in the support structures are here likewise translated relative to deck 10.

The displacing means comprise the bull rail guides 15*ap* and 15*as* connected to deck 10 on starboard side and the secondary rail guides 15*bp* and 15*bs* on port side, and further a number of hydraulic piston cylinders 17*p* and 17*s* which are connected to a hydraulic circuit (not shown).

Figure 7:
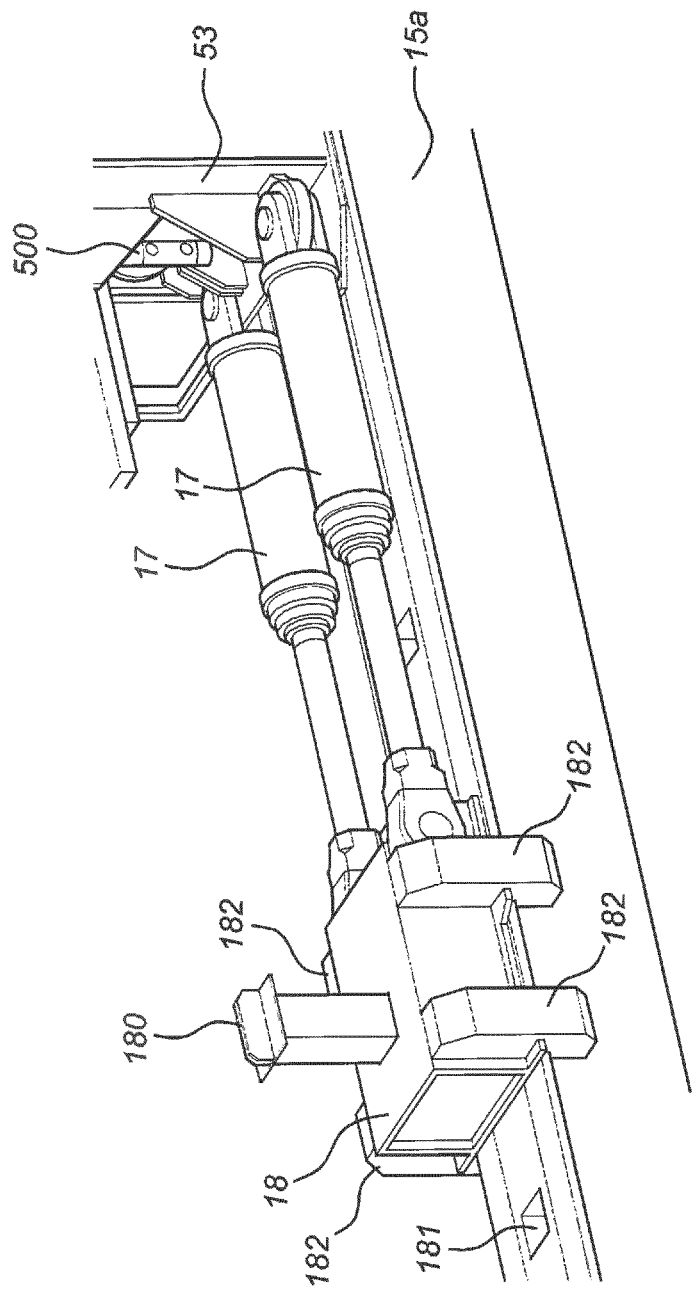
FIG. 7 is a schematic perspective view of a displacing means according to an embodiment of the invention.

Referring to FIG. 7, piston cylinders 17 are fixedly connected on a cylinder side to a support structure 50, or at least a support part 51 or an upright 53 thereof, and on a piston side to a slide block 18. Upright 53 (or another component of support structure 50) can be fixed to bull rail guide 15*a* using a fixing pin 500. Slide block 18 can be fixedly connected to the bull rail guide 15*a* using a pin 180 by arranging pin 180 in a fixing opening 181 arranged in bull rail guide 15*a* for coupling. By extending or conversely retracting the cylinder piston, a support structure 50 can be moved over the bull rail guide 15*a* in the direction of the stern 28 of platform 1, or in the direction of lifting crane 6. The collective displacement of the support structures (50*a*, 50*b*, 50*c*, 50*d*) and more specifically of the support parts (51*ap*, 51*bp*, 51*cp*, 51*dp*) on port side and the corresponding support parts (51*as*, 51*bs*, 51*cs*, 51*ds*) on starboard side can be performed as follows. Firstly, fixing pins 500 (500*p* on port side and 500*s* on starboard side) are retracted so that support structures 50 become detached from the bull rail guides 15*ap* and 15*as*. Piston cylinders 17*p* and 17*s* are then extended so that support structures 50 slide over the bull rail guides 15*p* and 15*s* and are displaced. Slide blocks 18*p* and 18*s* are here fixedly connected to bull rail guide 15*a* using pins 180*p* and 180*s*. During displacement of support structures 50 the pins 180*p* and 180*s* transmit the horizontal forces from slide blocks 18*p* and 18*s* to an upper flange of bull rail guides 15*ap* and 15*as*. Vertical forces are absorbed by side clamps 182*p* and 182*s* which are provided on slide blocks 18*p* and 18*s* and which engage around the upper flange of bull rail guide 15*a*. Fixing pins 500*p* and 500*s* are then pressed out so that support structures 50 are fixed on the bull rail guides 15*ap* and 15*as*. Piston cylinders 17*p* and 17*s* are then retracted again, whereby slide blocks 18*p* and 18*s* slide over the bull rail guides 15*p* and 15*s* and are displaced in the direction of support structures 50. Finally, slide blocks 18*p* and 18*s* are fixedly connected to bull rail guide 15*a* using pins 180*p* and 180*s* by arranging the pins 180*p* and 180*s* in the fixing openings 181 arranged in the bull rail guides 15*ap* and 15*as*. The above described displacing process can be repeated a number of times.

In FIGS. 4A and 4B cylinder pistons 17*p* and 17*s* are in retracted position, wherein the support structures 50*p* and 50*s* are in a position which is as far removed as possible from the stern 28 of platform 1 or, alternatively, is as far removed as possible from lifting means 6. By extending piston cylinders 17*p* a number of times, as described above, the support parts (51*ap*, 51*bp*, 51*cp*, 51*dp*) are, with reference to FIG. 4A, shifted to the right in the direction of the stern 28 and the lifting means 6 (not shown). By simultaneously extending piston cylinders 17*s* a number of times, as described above, the support parts (51*as*, 51*bs*, 51*cs*, 51*ds*) are, with reference to FIG. 4B, shifted to the left in the direction of the stern 28 and the lifting means 6 (not shown).

In order to free up space on the side of the support structures (50*a*, 50*b*, 50*c*, 50*d*) situated closest to lifting means 6 (or stern 28) the support parts 51*dp* and 51*ds* are in this embodiment rotatable in the directions of the arrows 56*p* and 56*s* around vertical axes 58*p* and 58*s*. The support parts 51*dp* and 51*ds* which have been rotated away thus take up less space in the direction of movement 16, whereby a subsequent support structure 50, in this case the support structures 51*cp* and 51*cs*, and the upending tool 8, can be moved closer to lifting means 6 and within reach thereof. Rotation around axes 58*p* and 58*s* reduces the occupied width 59 of the support parts 51*dp* and 51*ds* lying closest to lifting means 6 in the direction of movement 16 to a smaller occupied width 59*a* (see FIG. 2B).

Figure 6:
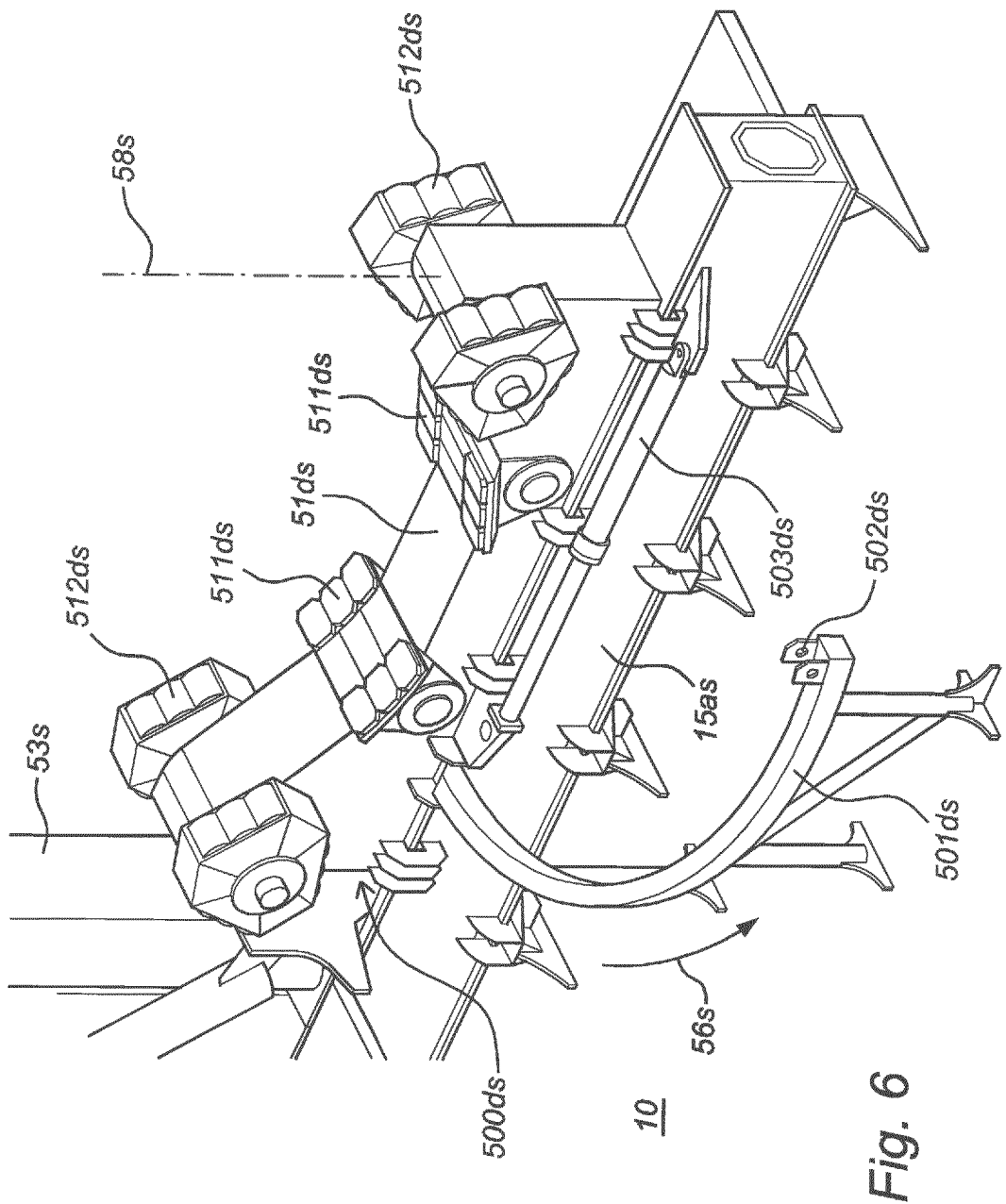
FIG. 6 is a schematic perspective detail view of a rotatable support part according to an embodiment of the invention; and, finally

FIG. 6 shows a detail view of a rotatable support part 51*ds*. Support part 51*ds* is fixed on the bull rail guide 15*as* by means of a pin connection 500*ds*. By uncoupling this pin connection 500*ds* the support part 51*ds* can be rotated around a vertical axis 58*s* in the direction 56*s*. Support part 51*s* supports here on a rotation rail guide 501*ds* which is connected to deck 10. In the position in which support part 51*ds* has been rotated away it is fixed on the rotation rail guide 501*ds* using a pin connection 502*ds*. The rotation is activated by a piston cylinder 503*ds* which is connected with a cylinder part fixedly to deck 10, and on a piston side to support part 51*ds*. By retracting the piston the support part 51*ds* will rotate in the direction 56*s*. When the piston extends, support part 51*ds* is rotated in the direction of the bull rail guide 15*as* again until it runs substantially parallel thereto.

The invention is not limited to the above described exemplary embodiments, and many variants thereof are possible within the scope of protection of the appended claims.

The invention claimed is:

1. A vessel comprising a lifting means provided in a position and a device for upending an elongate element from a deck of the vessel using the lifting means, comprising:
   a plurality of support structures, mutually coupled and running parallel to each other, each configured for supporting an elongate element of a plurality of elongate elements in lying position, wherein each support structure comprises for this purpose two support parts, placed at a mutual distance in a longitudinal direction of the support structure and connected to the deck, and configured for supporting peripheral parts of one elongate element provided in the support structure; and displacing means configured to displace the plurality of support structures collectively, parallel to the deck, towards or away from the position of the lifting means in a direction running substantially perpendicularly of the longitudinal direction of the support structures, which enables moving an elongate element provided in one of the support structures within reach of the lifting means;

wherein at least one of the plurality of support structures of the device further comprises an upending tool which is connected for pivoting around an axis running parallel to an edge of the vessel to the at least one support structure and is configured to support an elongate element received in the at least one support structure when this elongate element is upended with the lifting means, wherein the upending tool is rotated around the axis; and wherein the support parts of a support structure in unloaded state, in which no element is present in the support parts, are rotatable around an axis running perpendicularly of the deck.

2. The vessel according to claim 1, wherein the displacing means are configured to displace the support structures in the direction of the lifting means.

3. The vessel according to claim 1, wherein the device comprises a stack of support structures, wherein the support parts of a support structure are situated above support parts of another support structure in the stack.

4. The vessel according to claim 1, wherein the support structure comprising the rotatable support parts is situated closest to the lifting means relative to the other support structures.

5. The vessel according to claim 1, wherein the support structure comprising the upending tool is situated second closest to the lifting means relative to the other support structures.

6. The vessel according to claim 3, wherein the stack of support structures is situated furthest from the lifting means relative to the other support structures.

7. The vessel according to claim 1, wherein the number of coupled support structures amounts to at least 3.

8. The vessel according to claim 1, wherein the support structures are mutually coupled by coupling of their support parts which are connected to the deck.

9. The vessel according to claim 1, wherein the support parts of the support structures connected to the deck extend along a line running substantially parallel to a side edge of the vessel.

10. The vessel according to claim 9, wherein the support parts comprise support parts disposed on port side and on starboard side.

11. The vessel according to claim 1, wherein the displacing means comprise a guide which is connected to the deck and over which the support structures can slide in the direction running perpendicularly of the longitudinal direction of the support structures.

12. The vessel according to claim 1, wherein a support surface of a support part is curved such that it connects to a peripheral part of an element received in the support structure.

13. A method for upending an elongate element from a deck of a vessel using a lifting means, making use of the vessel according to any one of the foregoing claims, wherein a plurality of elongate elements is supported in lying position on the deck by mutually coupled elongate support structures which run parallel to each other and each comprise two support parts, placed at a mutual distance in a longitudinal direction of the support structure and connected to the deck, configured for supporting peripheral parts of an element provided in the support structure, wherein the support structures are collectively displaced, parallel to the deck, towards the position of the lifting means in order to move an element to be lifted within reach of the lifting means, and wherein a support structure further comprises an upending tool which is connected to the vessel for pivoting around an axis running parallel to an edge of the vessel, and an elongate element received in this support structure is supported by the upending tool when this element is upended with the lifting means, wherein the upending tool is rotated around the axis, wherein elements are received in a stack of support structures, wherein the support parts of a support structure are situated above support parts of another support structure in the stack.

14. The method according to claim 13, wherein the support structures are displaced in a direction running substantially perpendicularly of the longitudinal direction of the support structures.

15. The method according to claim 13, wherein the support structures are displaced in the direction of the lifting means.

16. The method according to claim 13, wherein the support parts of a support structure in unloaded state, in which no element is present in the support parts, are rotated around an axis running perpendicularly of the deck.

17. The method according to claim 16, wherein the support parts which are rotated are situated closest to the lifting means relative to the other support structures.

18. The method according to claim 13, wherein the support structure which comprises the upending tool is situated second closest to the lifting means relative to the other support structures.

19. The method according to claim 13, wherein the stack of support structures is situated furthest from the lifting means relative to the other support structures.

20. The method according to claim 13, wherein the support structures are slid over a guide connected to the deck in the direction running perpendicularly of the longitudinal direction of the support structures.

\* \* \* \* \*